Figure 1:
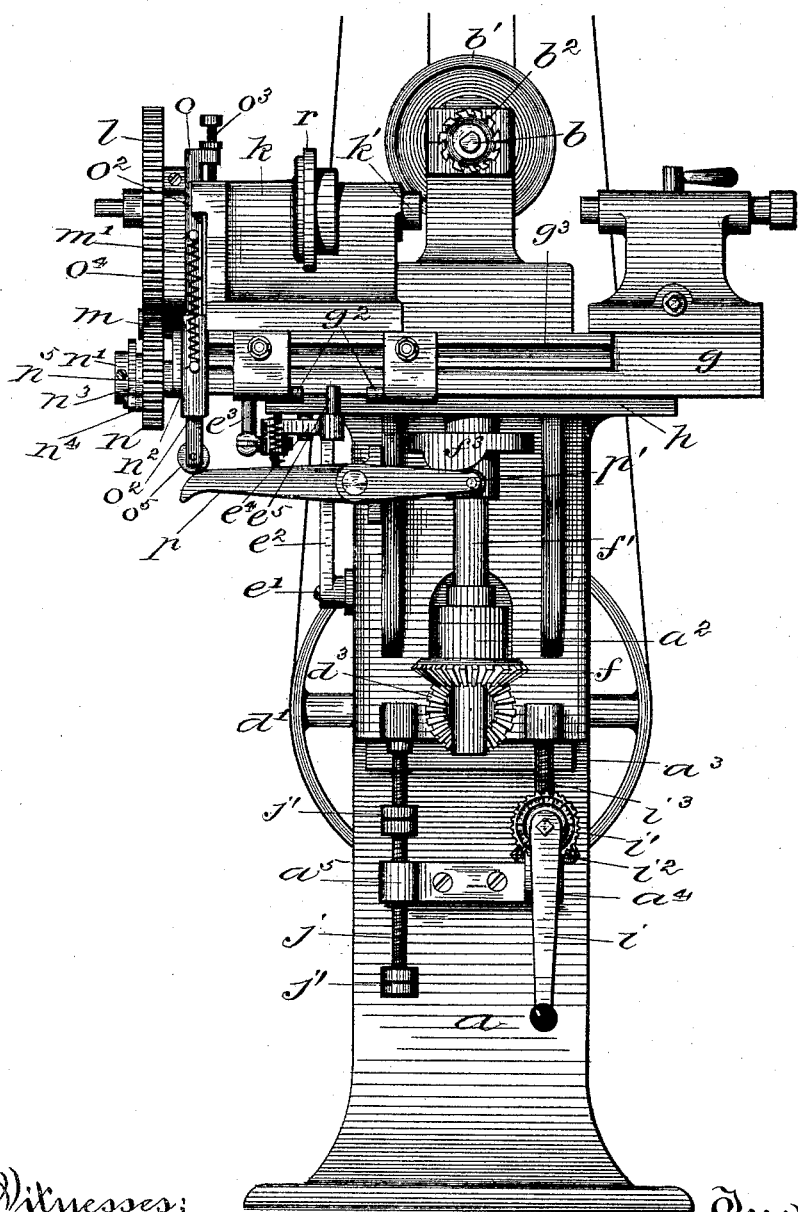

(No Model.) 3 Sheets—Sheet 1.

F. W. CLOUGH.
GEAR CUTTER.

No. 476,734. Patented June 7, 1892.

Witnesses:
G. B. Jenkins.
P. A. Phelps.

Inventor,
Francis W. Clough,
Harry R. Williams
Atty.

(No Model.) 3 Sheets—Sheet 2.

F. W. CLOUGH.
GEAR CUTTER.

No. 476,734. Patented June 7, 1892.

Fig. 2

Witnesses:
T. B. Jenkins,
P. A. Phelps.

Inventor,
Francis W. Clough,
Harry R. Williams
atty.

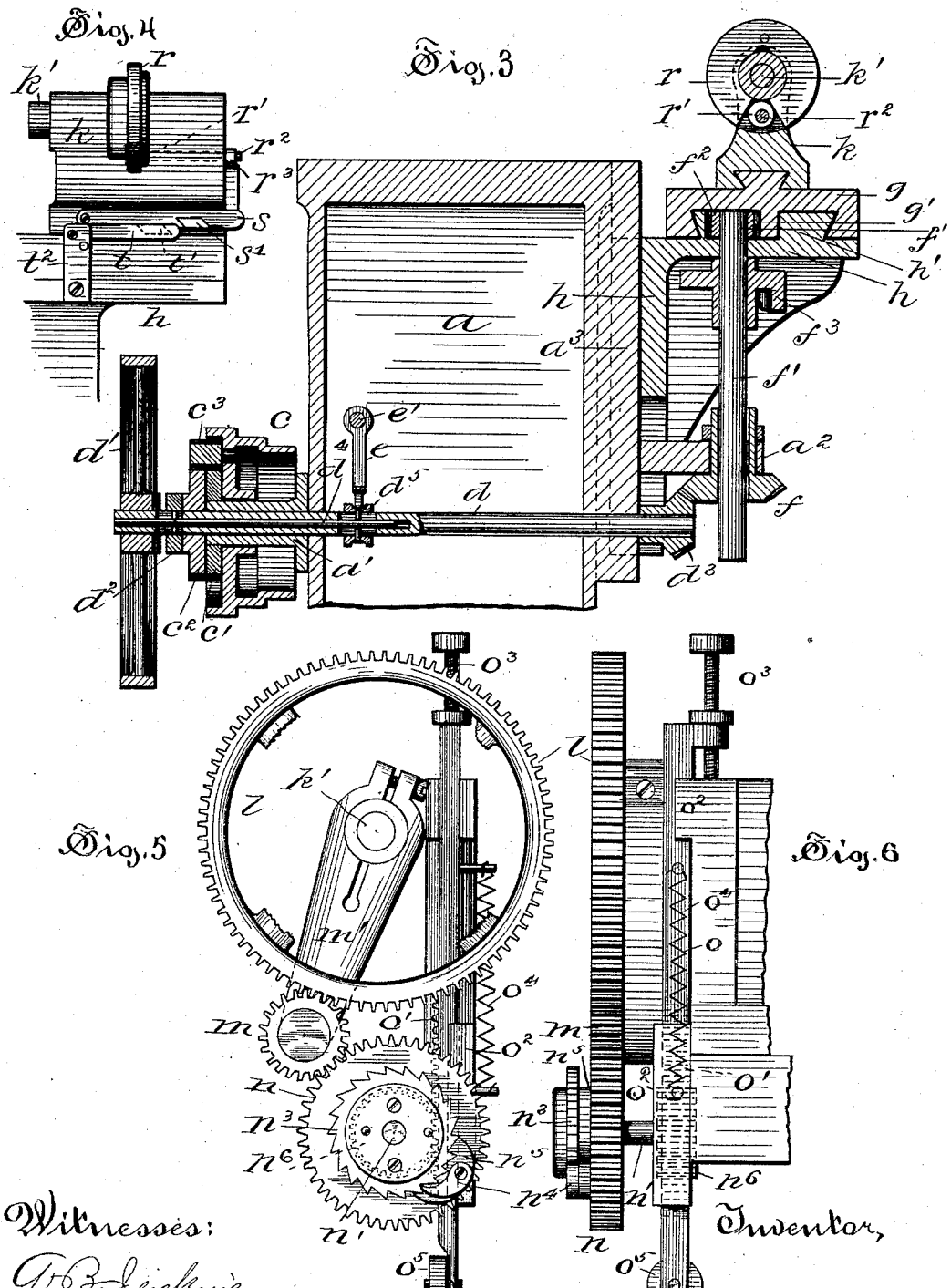

United States Patent Office.

FRANCIS W. CLOUGH, OF SPRINGFIELD, MASSACHUSETTS.

GEAR-CUTTER.

SPECIFICATION forming part of Letters Patent No. 476,734, dated June 7, 1892.

Application filed November 7, 1891. Serial No. 411,162. (No model.)

*To all whom it may concern:*

Be it known that I, FRANCIS W. CLOUGH, a citizen of the United States, residing at Springfield, in the county of Hampden and State of Massachusetts, have invented certain new and useful Improvements in Gear-Cutters, of which the following is a full, clear, and exact specification.

This invention relates to the class of machines for automatically cutting gears or cutting, marking, or dividing the edge of a blank into a number of equal divisions; and the object is to provide a machine which by simple adjustment may be set to automatically cut blanks of different diameter to provide them with any desired number of teeth or other projections.

To this end the invention resides in a machine having a holding mechanism mounted upon a reciprocating carriage which presents a blank to a cutter, an adjustable registering mechanism which intermittently rotates the blank a predetermined proportion of a revolution, so that the desired number of teeth may be cut or divisions marked, a shipping mechanism for reversing the movement of the carriage, and a cutting mechanism for cutting or dividing the periphery of the blank presented.

Referring to the accompanying drawings, Figure 1 is a front elevation of the machine. Fig. 2 is a side view of the same. Fig. 3 is a central vertical section of a portion of the machine, showing the carriage-feeding and spindle-clamping mechanism. Fig. 4 is a rear elevation of the reciprocating spindle-carriage, showing the clamp-releasing mechanism. Fig. 5 is an enlarged elevation of the adjustable registering mechanism. Fig. 6 is an edge view of the same.

In the views, $a$ indicates a columnar base supporting on top in suitable bearings a shaft $b$, with a speed-pulley $b'$, adapted to be belted to any source of power. To the front end of this shaft is secured a cutter $b^2$, suitably shaped to cut away the periphery of the blank presented to form teeth or divisions of the desired shape, while at the rear this shaft bears a speed-pulley $b^3$, that is belted to a speed-pulley $c$, loosely mounted on a hub $a'$, projecting from the side of the base, Fig. 3. Stationarily secured to this hub is a gear $c'$, while a differential gear $c^2$ next to it is loosely journaled upon a shaft $d$, that passes through the center of the hub across the base. A pinion $c^3$, pivoted to the face of the pulley $c$, meshes with these differential gears, so that as the pulley revolves in one direction the outside gear revolves more slowly in the opposite direction. Upon the end of the shaft $d$ at the rear of the machine is loosely mounted a pulley $d'$, which is belted to any suitable power, and between the notched hub of this pulley and the notched hub of the gear $c^2$ is a sliding clutch $d^2$, rotarily secured to the shaft and adapted to be reciprocated into engagement with either the hub of the pulley $d'$ or gear $c^2$. When the clutch engages the hub of the gear, the shaft $d$ is rotated slowly in one direction; but when engaging the hub of the pulley $d'$ the shaft is rotated more rapidly in the opposite direction. On the end of the shaft at the front of the machine is a bevel-gear $d^3$, that meshes with a bevel-gear $f$, supported in a bearing formed in an arm $a^2$, projecting from the base. Splined to the gear $f$, so as to rotate with but slide longitudinally through it is a shaft $f'$, having on its upper end a pinion $f^2$, that meshes with a rack $g'$ on the bottom of a carriage $g$, so that when the pinion is rotated and drives the rack the carriage has a horizontal movement along a tenoned way $h'$ on the top of a table $h$, which is supported and is vertically movable on a tenoned way $a^3$, formed on the front of the base. This table is raised and lowered by means of a crank $i$, connected with a bevel-gear $i'$, journaled in a frame $a^4$, projecting from the base, the gear $i'$ meshing with a bevel-gear $i^2$, which rotates upon a screw $i^3$, connected with the end of the table-support. A screw $j$, connected to the opposite side of the table-support, passing freely through a bracket $a^5$, bears adjustable nuts $j'$, which may be set to determine the limit of vertical movement of the table.

The shaft $d$ is shown as hollow and holding a rod $d^4$, connected by a pin at one end with the clutch-collar $d^2$ and at the opposite end with a collar $d^5$, that is reciprocated by the movement of a shipping-lever $e$, connected with an oscillating bar $e'$, supported by the base and bearing a rocking arm $e^2$, that is connected by a swiveled rod $e^3$ with an angle-lever $e^4$, pivoted to the under side of the table $h$. The front end of the lever $e^4$ has a stud $e^5$ in the path of stops $g^2$, adjustable along a way $g^3$ on the movable carriage $g$, so that when the stops come in contact with the stud $e^5$ the shipping mechanism is operated and the clutch moved out of engagement with one part into engagement with the other to reverse the motion of the shafts and gears which move the carriage.

The carriage preferably bears at one end, in a suitable stock $k$, a live-spindle $k'$, to which the blank to be cut is secured, and at the opposite end a dead-spindle. The live-spindle bears a registering gear $l$, that meshes with a pinion $m$, in mesh with a gear $n$. The pinion $m$ is preferably pivoted to a swinging arm $m'$, that oscillates upon a hub on the carriage having the same center as the live-spindle, and the gear $n$ is loosely removably mounted upon a shaft $n'$, supported by a bearing $n^2$, connected with the carriage. Removably secured to one end of the shaft $n'$ is a disk $n^3$, having a number of ratchet-teeth on its periphery, in engagement with which is a pawl $n^4$, connected with a leaf $n^5$, secured to the gear $n$, so that when the shaft $n'$ is rotated in one direction the ratchet by means of the pawl rotates the gear which, through the pinion, moves the large gear or index wheel, while a movement of the shaft in the opposite direction feeds the ratchet freely under the pawl, Figs. 5 and 6. The shaft $n'$ also bears a pinion $n^6$, that meshes with a rack $o'$ on a slide $o$, that has a vertical reciprocation in ways $o^2$ on the carriage. The upper end of this slide bears a screw $o^3$, with adjustable set-nuts, to limit the movement of the slide as it is pulled downward by a spring $o^4$, and the lower end of the slide bears a roll $o^5$ in the path of one end of a lever $p$, that is pivoted to the table $h$. The other end of the lever $p$ bears a roll $p'$ in contact with a cam $f^3$ on the vertical shaft $f'$. When the lever $p$ is oscillated by the cam $f^3$, the slide is lifted and its rack $o'$ rotates the pinion $n^6$ and drives the shaft $n'$, bearing the ratchet $n^3$.

The live-spindle $k'$ is held fast from rotation by a split friction-ring $r$, that grasps the spindle or a collar attached thereto, and between the ends of this ring is placed a wedge or cam $r'$ on a shaft $r^2$, to the end of which is secured a rocker-arm $r^3$, Figs. 2, 3, and 4. In contact with the end of this arm $r^3$ is the end of a bent lever $s$, that is pivoted to the side of the carriage. On a face of this lever $s$ an inclined lug $s'$ is placed in the path of an inclined lug $t'$ on a lever $t$, pivoted to an arm $t^2$, projecting from the table $h$. When the carriage moves in one direction, the lugs lift the lever $s$, which raises the arm $r^3$ so that the cam $r'$ is rotated, spreading the ring to free the spindle and allow the registering mechanism to rotate the blank and present another point of its periphery to the cutter; but when the carriage moves in the opposite direction the lugs lift the lever $t$ only, the ring remaining closed and firmly clamping the spindle which holds the blank.

A blank disk of any diameter within the limit of the machine is secured to the live-spindle, supported by the dead-spindle, and the table raised or lowered by means of the crank until the periphery of the blank is in the plane of the cutter, which is rapidly revolved by belting its pulleys to any suitable source of power. As the cutter-shaft revolves the loose pulley $c$ is revolved by the belt from the pulley $b^3$, so that the pinion $c^3$, through the differential gears $c'$ $c^2$ and clutch $d^2$, slowly revolves the shaft $d$, which, through the bevel-gears $d^3$ $f$, shaft $f'$, pinion $f^2$, and rack $g'$, moves the carriage $g$ slowly, carrying the blank beneath the cutter. When the carriage has traveled sufficiently for the cutter to cut across the periphery of the blank, one of the stops $g^2$ comes in contact with the stud $e^5$, so as to throw the lever $e^4$, which is connected with the clutch $d^2$, and slides it from contact with the gear $c^2$ to the pulley $d'$, which, being revolved rapidly in the opposite direction, reverses the rotation of the shafts and moves the carriage with the blank quickly backward until the other stop strikes the stud and ships the clutch back again to the gear, when the carriage again moves forward. As the carriage moves back after a cut has been made and is about to again move forward the cam $f^3$ rocks the lever $p$, so as to raise the slide $o$, which, through its rack $o'$, the pinion $n^6$, and ratchet $n^3$, rotates the registering gears $n$ $m$ $l$, causing the spindle to rotate a portion of a revolution and present an uncut part of the periphery of the blank in the plane of the cutter. When the cam passes the end of the lever, the slide is pulled down by its spring and the ratchet feeds freely under the pawl a predetermined number of teeth, depending on the position of the adjusting-screw at the top of the slide, so that at the next feed the desired proportional amount of a revolution will be given to the blank being cut. As the cam $f^3$ rocks the lever $p$ to feed the registering mechanism and turn the live-spindle the clamping-ring $r$ is opened by means of the cam $r'$, so that the spindle is free to rotate; but at all other times the ring firmly grasps the spindle, so that it cannot be moved when the cutter is operating.

By adjusting the screw $o^3$ the amount of downward movement of the slide is determined, so that the ratchet will feed the exact number of teeth to feed the disk a desired proportional part of a revolution. By providing a series of ratchets having teeth of varying size and a series of gears having varying numbers of teeth, which can be easily placed upon or removed from the shaft $n'$, combinations of these can be so made that the registering gears will give any desired number of intermittent proportional movements to the live-spindle, in order that a gear may be cut in the machine with any desired number of teeth or a blank may have its periphery divided into any desired number of divisions.

I claim as my invention—

1. In combination, a stationary base bearing a shaft having a cutter with a rotary movement only and bearing a horizontally-moving carriage having a live-spindle with a gear in mesh with a pinion meshing with an intermittently-rotated gear, and mechanism connected with the driving-power for intermittently rotating the gear, all substantially as described.

2. In combination, a stationary base bearing a shaft having a cutter with a rotary movement only and bearing a vertically-moving table supporting a horizontally-moving carriage having a live-spindle with a gear in mesh with a pinion meshing with an intermittently-rotated gear, and mechanism connected with the driving-power for intermittently rotating the gear, all substantially as specified.

3. In combination, a base bearing a shaft having a rotary cutter and bearing a horizontally-moving carriage having a live-spindle with a gear in mesh with a pinion meshing with an intermittently-rotated gear, mechanism connected with the driving-power for intermittently rotating the gear, and an intermittently-operated clutch mounted upon the carriage for holding the live-spindle during the forward movement of the carriage, all substantially as specified.

4. In combination, a base bearing a shaft having a rotary cutter and bearing a vertically-moving table supporting a horizontally-moving carriage having a live-spindle with a gear in mesh with a pinion meshing with an intermittently-rotated gear, mechanism connected with the driving-power for intermittently rotating the gear, and a clutch mounted upon the carriage for holding the live-spindle during the forward movement of the carriage, all substantially as described.

5. In combination, a base bearing a shaft having a rotary cutter and bearing a horizontally-moving carriage having a live-spindle with a gear in mesh with a pinion meshing with an intermittently-rotated gear, mechanism connected with the driving-power for intermittently rotating the gear, a shipping mechanism with a part in the path of movement of the carriage for throwing a clutch from a part revolving in one direction to a part revolving in the opposite direction, and the clutch connected with the carriage-moving mechanism, all substantially as described.

6. In combination, a base bearing a shaft having a rotary cutter and bearing a vertically-moving table supporting a horizontally-moving carriage having a live-spindle with a gear in mesh with a pinion meshing with an intermittently-rotated gear, mechanism connected with the driving mechanism for intermittently rotating the gear, a shipping mechanism with a part in the path of movement of the carriage connected by a swiveled rod with a shipping-lever for throwing a clutch from a part revolving in one direction to a part revolving in the opposite direction, and the clutch connected with the carriage-moving mechanism, all substantially as described.

7. In combination, a base bearing a shaft having a rotary cutter and bearing a horizontally-moving carriage having a live-spindle with a gear in mesh with a pinion meshing with a gear bearing a pawl in engagement with a ratchet secured to a shaft bearing a pinion meshing with a rack reciprocated by a lever, and mechanism connected with the driving-power for oscillating the lever, all substantially as specified.

8. In combination, a base bearing a shaft having a rotary cutter and bearing a horizontally-moving carriage having a live-spindle with a gear in mesh with a pinion meshing with a gear having a pawl in engagement with a ratchet secured to a shaft bearing a pinion meshing with a rack having an adjusting-screw and reciprocated by a lever, and mechanism connected with the driving-power for oscillating the lever, all substantially as described.

9. In combination, a base bearing a shaft having a rotary cutter and bearing a vertically-movable table supporting a horizontally-moving carriage having a live-spindle with a gear in mesh with a pinion meshing with a gear having a pawl in engagement with a ratchet secured to a shaft bearing a pinion meshing with a rack having an adjusting-screw and reciprocated by a lever, mechanism connected with the driving-power for oscillating the lever, and a shipping mechanism with a part in the path of movement of the carriage for throwing a clutch from a part revolving in one direction to a part revolving in the opposite direction, and the clutch connected with the carriage-moving mechanism, all substantially as specified.

10. In combination with a cutting-machine, a movable carriage bearing a spindle having a gear in mesh with a pinion meshing with a readily-removable gear mounted upon a shaft, a slide connected with the said shaft, and mechanism connected with the driving-power for reciprocating the slide and giving to the gear an intermittent rotary movement, all substantially as described.

11. In combination with a cutting-machine, a movable carriage bearing a spindle having a gear in mesh with a pinion meshing with a gear mounted upon a shaft and bearing a pawl in engagement with a readily-removable ratchet secured to said shaft, a slide connected with the shaft, and mechanism connected with the driving-power for reciprocating the slide and giving to the gears an intermittent rotary movement, all substantially as described.

12. In combination, in a cutting-machine, a movable carriage bearing a spindle having a gear in mesh with a pinion mounted upon an oscillating bearing and meshing with a readily-removable gear mounted upon a shaft, a slide connected with said shaft, and mechanism connected with the driving-power for reciprocating the slide and giving to the gears an intermittent rotary movement, all substantially as described.

13. In combination with a cutting-machine, a movable carriage bearing a spindle having a gear in mesh with a pinion meshing with a readily-removable gear loosely mounted upon a shaft and bearing a pawl in engagement with a ratchet removably secured to said shaft, a slide bearing a rack in mesh with a pinion mounted upon said shaft, and mechanism connected with the driving-power for reciprocating the slide, all substantially as described.

14. In combination with a cutting-machine, a movable carriage bearing a spindle having a gear in mesh with a pinion meshing with a gear mounted upon a shaft, a slide connected with said shaft, mechanism connected with the driving mechanism for reciprocating the slide and giving to the gears an intermittent rotary movement, and a clutch mounted upon the carriage holding the spindle during the forward movement of the carriage, all substantially as described.

15. In combination with a cutting-machine, a movable carriage bearing a spindle having a gear in mesh with a pinion meshing with a gear mounted upon a shaft, a slide connected with the shaft, mechanism connected with the driving-power for reciprocating the slide and giving to the gears an intermittent rotary movement, a split ring encircling the shaft mounted upon the carriage holding the spindle, and a cam for operating the ring, all substantially as specified.

FRANCIS W. CLOUGH.

Witnesses:
HARRY R. WILLIAMS,
JOHN P. HEALY.